United States Patent [19]
Theall, Jr.

[11] 4,257,126
[45] Mar. 17, 1981

[54] LOGARITHMIC RECEIVER FOR FIBER OPTIC SIGNALS

[75] Inventor: Charles E. Theall, Jr., Weston, Conn.

[73] Assignee: The Singer Company, Little Falls, N.J.

[21] Appl. No.: 116,072

[22] Filed: Jan. 28, 1980

[51] Int. Cl.³ .............................................. H04B 9/00
[52] U.S. Cl. ...................................... 455/619; 375/75; 375/76; 375/87; 455/608
[58] Field of Search ................... 455/619, 608; 375/55, 375/75, 76, 87

[56] References Cited
U.S. PATENT DOCUMENTS

| | | | |
|---|---|---|---|
| 3,979,746 | 9/1976 | Jarrett | 455/619 |
| 4,027,152 | 5/1977 | Brown | 455/619 |
| 4,166,980 | 9/1979 | Apostolos | 375/75 |

Primary Examiner—Howard W. Britton
Attorney, Agent, or Firm—Thomas W. Kennedy

[57] ABSTRACT

A fiber optic data logarithmic receiver is provided for use in a fiber optic data communication system of the type employing unipolar trapezoidal Manchester data encoding. The receiver of the invention is capable of processing unipolar optical Manchester signals transmitted over optical fibers. The receiver converts the optical signals into electrical signals to provide standard digital levels at the receiver output. The receiver incorporates a logarithmic amplifier, into which input signals are fed after passing through a photo-detector and pre-amplifier, and from which output signals are fed to a comparator after passing through a delay. The comparator compares the logarithmic output signal from the logarithmic amplifier, to a logarithmic threshold signal, and provides a comparator output signal.

10 Claims, 8 Drawing Figures

LOGARITHMIC RECEIVER FOR FIBER OPTIC SIGNALS

The present invention relates to a data receiver, and particularly to a data receiver for fiber optic signals having a logarithmic amplifier.

A prior data receiver, which was invented by the inventor of this application, and which was assigned to the same assignee as this application, is shown in co-pending U.S. application Ser. No. 35,119, filed May 1, 1979. Such prior receiver provides a desired amplitude versus time relation, and permits an accurate threshold generation. With the prior construction, the receiver responds to several input amplitude levels with an automatic feedback of gain control.

In accordance with the present invention, the receiver provides an equally accurate threshold generation. The receiver is less complex and of simpler design, particularly for an application, where there is a relatively large range of input amplitude level. In accordance with the invention, in place of using an automatic feedback of gain control, the receiver responds to input amplitude level, by using a logarithmic amplifier, which provides a logarithmic gain to the signal.

Accordingly, it is one object of the present invention to provide a data receiver, wherein the design is simpler and less complex, particularly in an application where there is a relatively wide range of amplitude level in the input signal.

It is another object of the invention to minimize feedback circuits, and to increase the operating speed of the receiver.

Still another object of the invention is to provide a receiver, the output of which provides an accurate reproduction of the time relation of the threshold crossing of the signal.

A further object of the invention is to provide a receiver, which has a gain law, such that a simple threshold relationship will provide accurate threshold crossings in the output signal.

A still further object of the invention is to provide a receiver, wherein the ratio of the signal pulse width change to amplification is minimized, whereby the signal threshold crossing accuracy is improved.

DETAILED DESCRIPTION OF THE EMBODIMENTS

Figure 1:
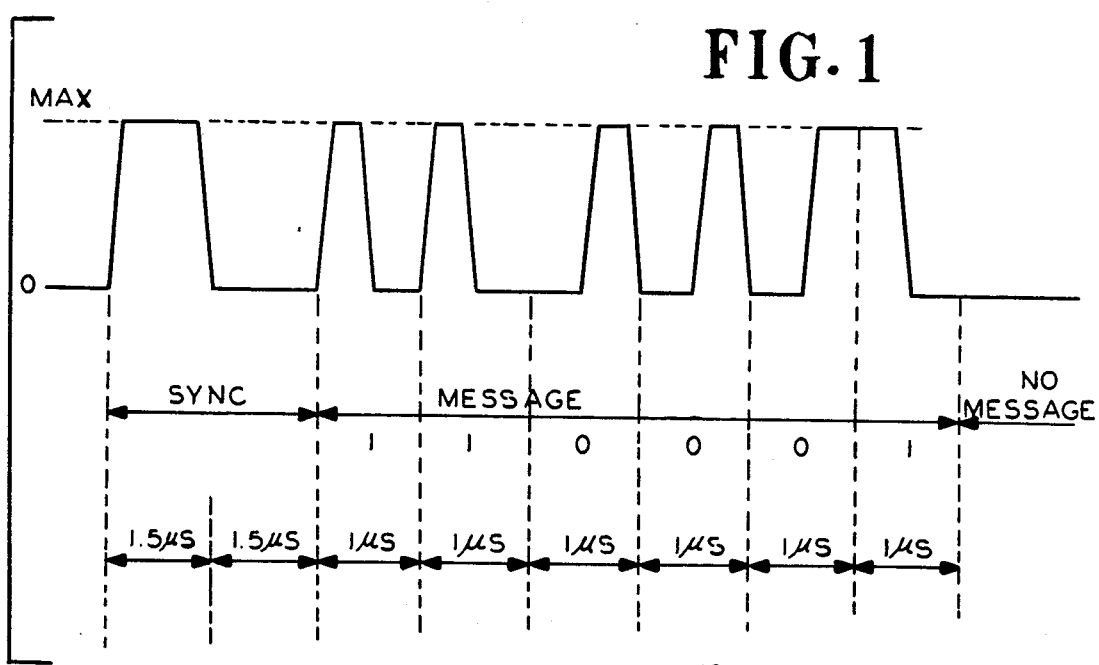
FIG. 1 is a representation of the unipolar trapezoidal Manchester optical signals transmitted in the fiber optics communication system with which the receiver of the present invention can be used.

Referring to FIG. 1, the trapezoidal unipolar Manchester optical signals transmitted in the system with which the receiver of the present invention is concerned has a unipolar form, and rises from zero to maximum levels to designate the various binary bits in the signal. The beginning of each message contains a synchronizing bit, as shown, for example, is 3.0 microseconds long. The signal then contains a series of message bits, each of which is 1 microsecond long, and each of which changes amplitude in the illustrated manner in order to designate a binary "1" or a binary "0".

Figure 2:
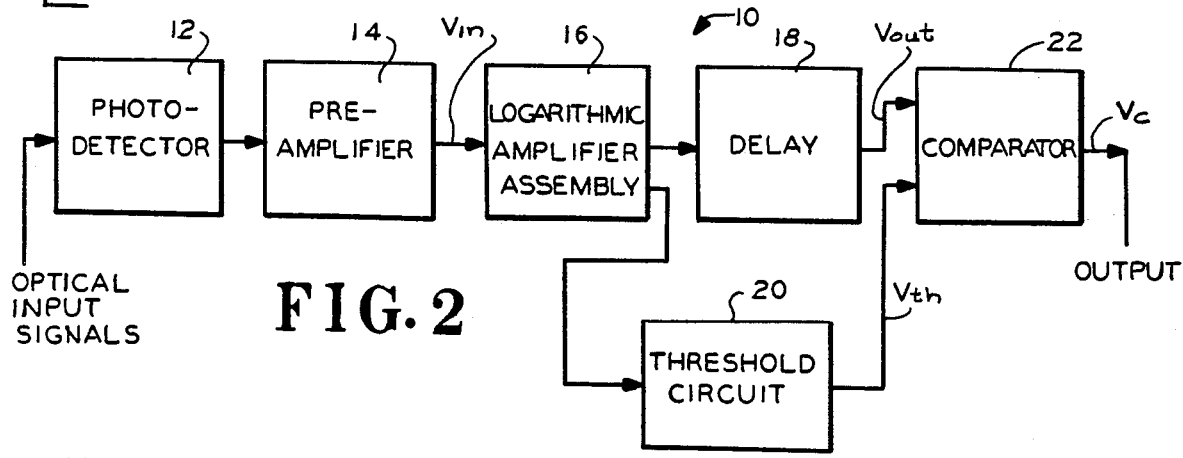
FIG. 2 is a block diagram of an embodiment of a receiver for detecting the optical signals of FIG. 1 according to the invention.

Referring to FIG. 2, one embodiment of the present invention is a receiver 10 for receiving and decoding the Manchester unipolar signals of FIG. 1. Receiver includes a photo-detector 12 which detects the received optical signals of FIG. 1. The output current of photo-detector 12 is converted to a voltage and amplified by a pre-amplifier 14. The output of pre-amplifier 14 provides the input voltage Vin to a logarithmic amplifier assembly 16. The output of logarithmic amplifier assembly 16 provides the input of delay 18. The delay output signal Vout is compared with a threshold signal Vth from a threshold circuit 20 in a comparator circuit 22. The output Vc of comparator 20 is decoded by an appropriate unit (not shown).

Photo-detector 12 includes a photodiode which typically has a linear response of 0.5 amps per watt over its input power range at infrared wavelengths. The response speeds of commercially available photodiodes are adequate for operation to 10 mb/s. Depleted operating junctions are important to avoid follow-on "long tails".

Pre-amplifier 14 performs a wide-band conversion of the photo-detector output current to an input voltage for the logarithmic amplifier assembly 16 with minimum introduction of noise. Since the photo-detector 12 is a current source, detector and amplifier input impedances can have band-limiting effects on the receiver unless low input impedance amplifiers are used.

Logarithmic amplifier assembly 16 has an output signal, which is proportional to the logarithm of its input signal. Logarithmic amplifier assembly 16 has a bandwidth, which is adequate for the frequency or bit rate of the input signal.

Delay 18, for example a delay line, delays the signal voltage without distortion. The delay of the signal voltage is required so that the threshold storage signal arrives at comparator 22 before the delayed input signal.

The comparator 22, in effect, converts unipolar signals to bipolar signals. The threshold circuit serves to predict the mid-amplitude level of the optical input signals. This accurate, timely prediction of the mid-amplitude signal crossings is the most critical receiver function. The preceding stages contribute with excellent noise and gain performances. The threshold circuit 20 generates a bias for the comparator 22, which enables the bipolar output signal to be generated without width or transition distortions.

Together with the threshold bias provided by threshold circuit 20, comparator 22 converts the unipolar signal into a bipolar output signal. That is, the comparator switches at the mid-amplitude points of the optical input signal. The comparator also represents a critical receiver function in relation to the detection algorithm in that pulse width and transition time deviations contribute materially to detection errors.

Figure 3:
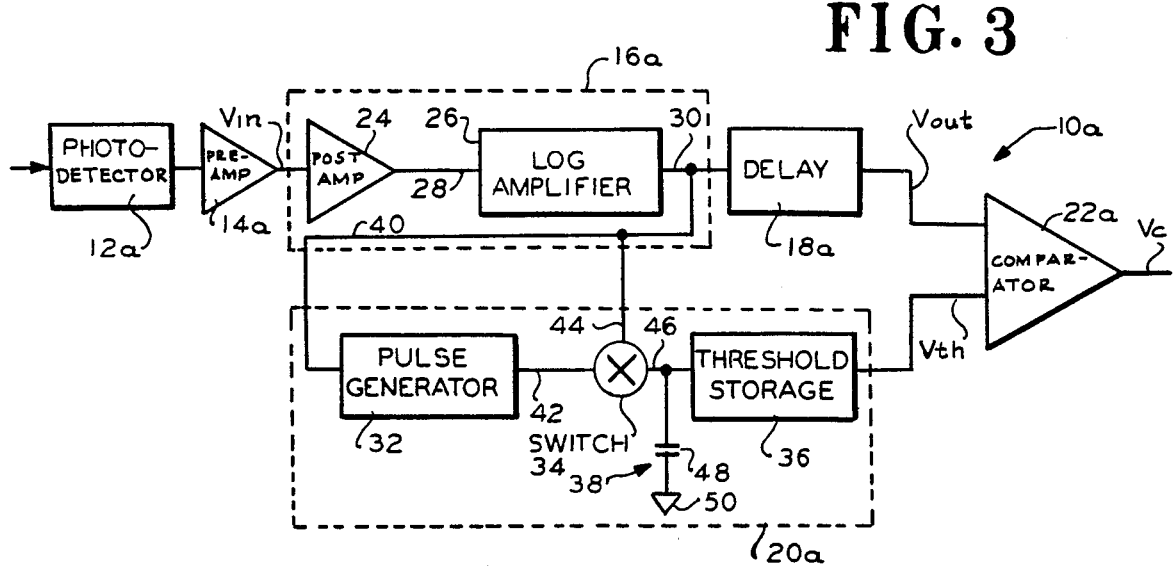
FIG. 3 is a block diagram showing the details of certain portions of the receiver of FIG. 2.
Figure 4:
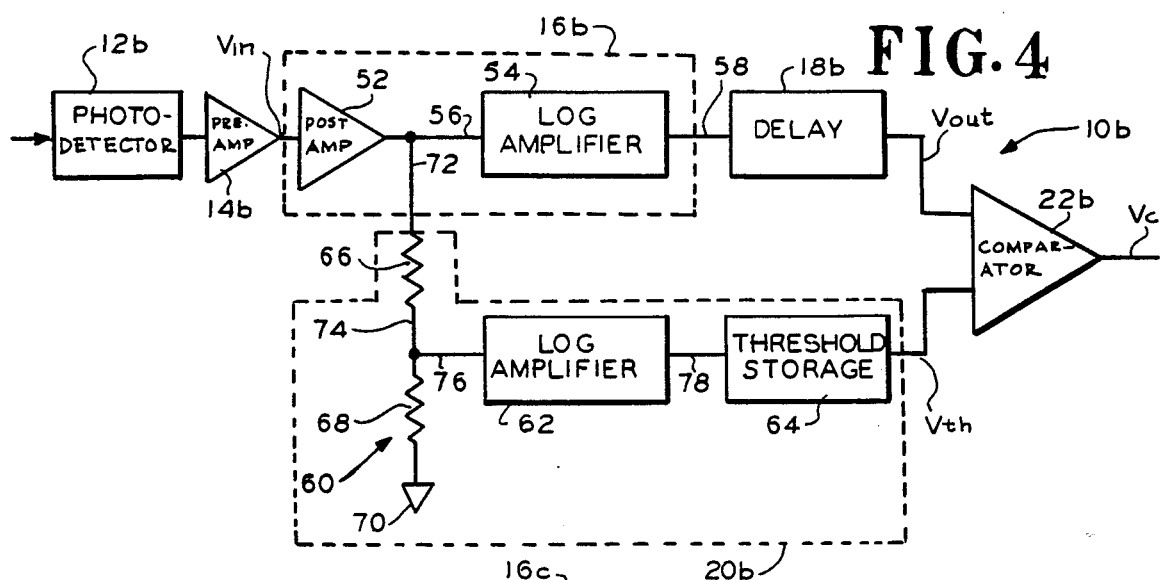
FIG. 4 is a block diagram showing alternate details of the portions of the receiver of FIG. 2.
Figure 5:
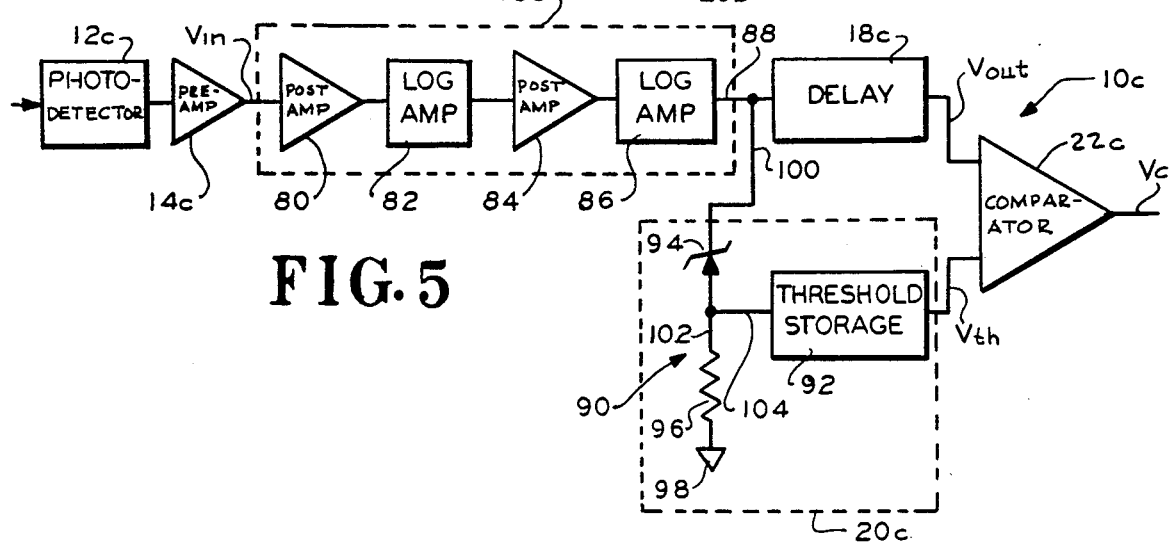
FIG. 5 is a block diagram showing still other alternate details of the portions of the receiver of FIG. 2.

Three other embodiments of receiver 10 are receiver 10a, receiver 10b, and receiver 10c, which are shown respectively in FIGS. 3,4 and 5. Parts of receiver 10a, shown in FIG. 3, which correspond to parts of receiver 10, have the same numerals, but with a subscript "a" added thereto. Parts of receiver 10b, shown in FIG. 4, which correspond to parts of receiver 10, have the same numerals, but with a subscript "b" added thereto. Parts of receiver 10c, shown in FIG. 5, which correspond to parts of receiver 10, have the same numerals, but with a subscript "c" added thereto.

Referring to FIG. 3, receiver 10a comprises a photodetector 12a, a pre-amplifier 14a, a logarithmic amplifier assembly 16a, a delay 18a, a threshold circuit 20a, and a comparator 22a.

Logarithmic amplifier assembly 16a includes a post amplifier 24, a log amplifier 26, a connector 28, which connects the output of post amplifier 24 to the input of log amplifier 26, and a connector 30, which connects the output of log amplifier 26 to the input of delay 18a.

Referring to FIG. 3, threshold circuit 20a includes a pulse generator 32, a switch 34, a threshold storage unit 36, and a shift unit 38. Pulse generator 32 has an input connector 40, which connects to connector 30, and an output connector 42, which connects to switch 34. Switch 34 has an input connector 44, which connects to connector 40, and an output connector 46, which connects to the input of threshold storage 36. Shift unit 38 includes a capacitor 48 and a ground 50.

Pulse generator 32 is a multivibrator; and switch 34 is an electronic switch, preferably a field effect transistor. The signal level is stored by pulse generator 32, switch 34, and capacitor 48. Shift unit 38 subtracts a fixed voltage $\Delta$, in order to achieve the threshold signal Vth.

Referring to FIG. 4, receiver 10b includes a photodetector 12b, a pre-amplifier 14b, a logarithmic amplifier assembly 16b, a delay 18b, a threshold circuit 20b, and a comparator 22b.

Logarithmic amplifier assembly 16b includes a post amplifier 52, a log amplifier 54, a connector 56, which connects the output of post amplifier 52 to the input of log amplifier 54, and a connector 58, which connects the output of log amplifier 54 to the input of delay 18b.

In FIG. 4, threshold circuit 20b includes a resistor assembly 60, a log amplifier 62, and a threshold storage 64.

In FIG. 4, resistor assembly 60 includes a first resistor 66, a second resistor 68, and a ground 70. First resistor 66 has an input connector 72, which connects to connector 56, and an output connector 74, which connects to resistor 62. Log amplifier 62 has an input connector 76, which connects to connector 74, and an output connector 78, which connects to threshold storage 64.

The signal voltage to resistor assembly 60, from connector 56, is divided in half by first resistor 66 and second resistor 68. The rsultant half signal in connector 76 is log attenuated by amplifier 62, and stored in threshold storage unit 64, in order to achieve the threshold voltage signal Vth.

Referring to FIG. 5, receiver 10c includes a photodetector 12c, a pre-amplifier 14c, a logarithmic amplifier assembly 16c, a delay 18c, a threshold circuit 20c, and a comparator 22c.

Logarithmic amplifier assembly 16c includes a first post amplifier 80, a first log amplifier 82, which connects to post amplifier 80, a second post amplifier 84, which connects to log amplifier 82, and, a second log amplifier 86, which connects to post amplifier 84. Amplifier 86 has a connector 88, which connects the output of amplifier 86 to the input of delay 18c.

In FIG. 5, threshold circuit 20c has a voltage shift unit 90, and a threshold storage 92, connected to assembly 90.

In FIG. 5, voltage shift unit 90 includes a zener diode 94, a resistor 96, and a ground 98. Zener diode 94 has an input connector 100, which connects to connector 88, and an output connector 102, which connects to resistor 96. Threshold storage 92 has an input connector 104, which connects to connector 102.

The signal voltage to voltage shift unit 90, is taken from connector 88, and a fixed voltage $\Delta$ is subtracted by zener diode 94 and resistor 96. The resultant logarithm signal is stored by threshold storage 92 as the threshold voltage signal Vth.

Figure 6:
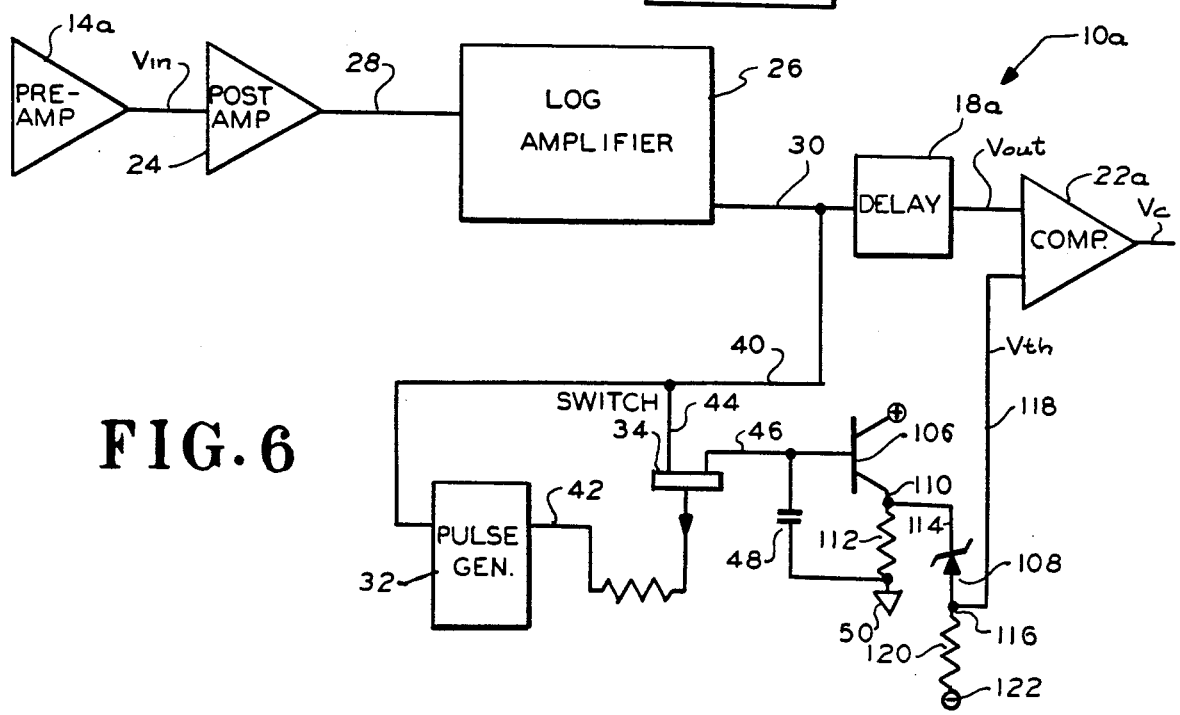
FIG. 6 is a detail drawing of the block diagram of FIG. 3.

Referring to FIG. 6, there is shown, in somewhat greater detail, the construction of receiver 10a. As shown in the block diagram of FIG. 3, and as shown in the detail drawing of FIG. 6, receiver 10a comprises pre-amplifier 14a, post amplifier 24, log amplifier 26, delay 18a, comparator 22a, pulse generator and multivibrator 32, switch and field effect transistor 34, and threshold storage 36.

In FIG. 6, threshold storage 36 includes an NPN transistor 106, and a zener diode 108. NPN transistor 106 has an output connector 110, which connects through a resistor 112 to ground 50. Zener diode 108 has an input connector 114, which connects to connector 110. Zener diode 108 has an output connector 116, which connects to comparator 22a through a connector 118, and which connects through a resistor 120 to a supply 122.

Standard piece parts can be used for the components of the embodiment of FIG. 6, as indicated hereafter.

| Component and Numeral | Manufacturer's Name, Piece Part Number |
| --- | --- |
| pre-amplifier 14a | Texas Instruments, TIED-152 |
| post amplifier 24 | Motorola, SE592 |
| delay 18a | Airtronic Instrument, Type 68 |
| comparator 22a | National Semiconductor, LM161 |
| pulse generator 32 | Texas Instruments, SN54122 |
| switch 34 | Siliconix, 2N3382 |
| NPN transistor 106 | Fairchild, 2N284 |
| capacitor 48 | Sprague, capacitor |
| zener diode 108 | Motorola, zener diode |
| log amplifier 26 | Texas Instruments, SN56502 with SN5511 |

Figure 7:
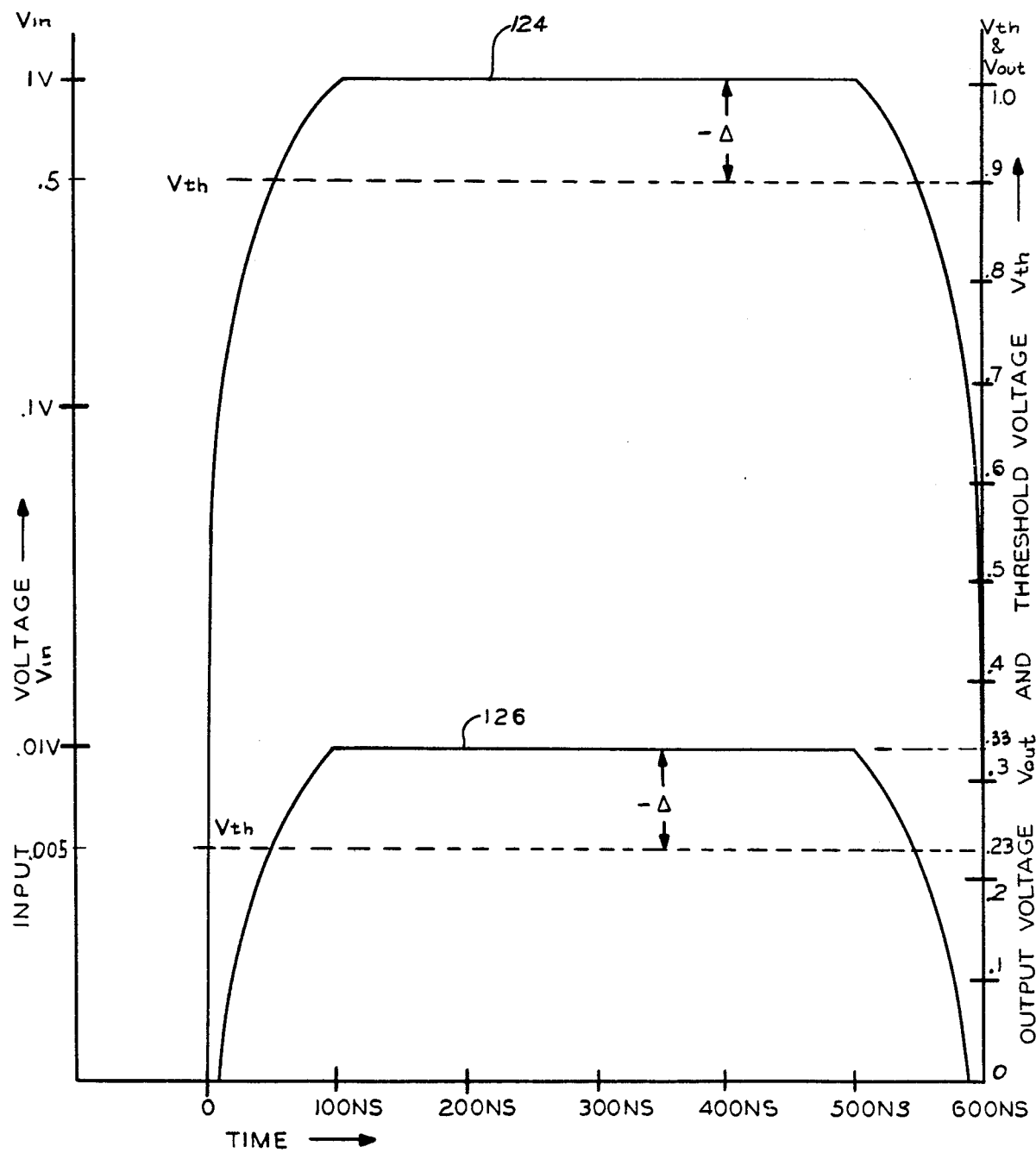
FIG. 7 shows one graph, which has a large signal curve and a small signal curve, and which has a reference input voltage along the left, vertical axis plotted on a logarithmic scale, and which has time along the horizontal axis plotted on a decimal scale, and which has an output voltage and threshold voltage along the right vertical axis plotted on a decimal scale, and wherein the large curve shows a portion of a large signal and the small curve shows a portion of a small signal.

Referring to FIG. 7, a graph is shown of reference input voltage Vin along the left, vertical axis on a multilogarithmic scale, plotted against time along the horizontal axis on a decimal scale, and having output voltage Vout and threshold voltage Vth along the right, vertical axis on a decimal scale. FIG. 7 shows a typical large signal curve 126, which has a peak input voltage Vin=1.0, a threshold voltage Vth=0.9, and output voltage Vout=1.0. FIG. 7 also shows a typical small signal curve 126, which has a peak input voltage Vin=0.01, a threshold voltage Vth=0.23, and output voltage Vout=0.33.

As shown in FIG. 2, the input voltage Vin enters logarithmic amplifier assembly 16, the output voltage Vout enters comparator 22 and the threshold voltage Vth also enters comparator 22.

A comparison of the ratios of peak input voltage values of large curve 124 to small curve 126 shows that the input voltage ratio is 100 to 1. Thus, this comparison of two typical signal curves 124 and 126 shows that receiver 10 can handle a large range of amplitudes of signals, using a construction, which is simpler than the construction of the previously described, known receiver.

As shown in FIG. 7, for large curve 124, the values shown are output voltage Vout=1.0 and threshold voltage Vth=0.90. For small curve 126, the values shown are output voltage Vout=0.33 and threshold voltage Vth=0.33. The respective differences, between the output voltage Vout and threshold voltage Vth, for the curves 124 and 126, are equal to 0.10, which are the same in value. Thus, although the input threshold voltage is 50 percent of the input voltage Vin in each curve, the difference between the output voltage Vout and threshold voltage Vth is always the same, that is 0.10. Since this difference is relatively small, and the same value, for different curves of largely different amplitude, comparator 22 can easily handle the large range in signal amplitude.

Figure 8:
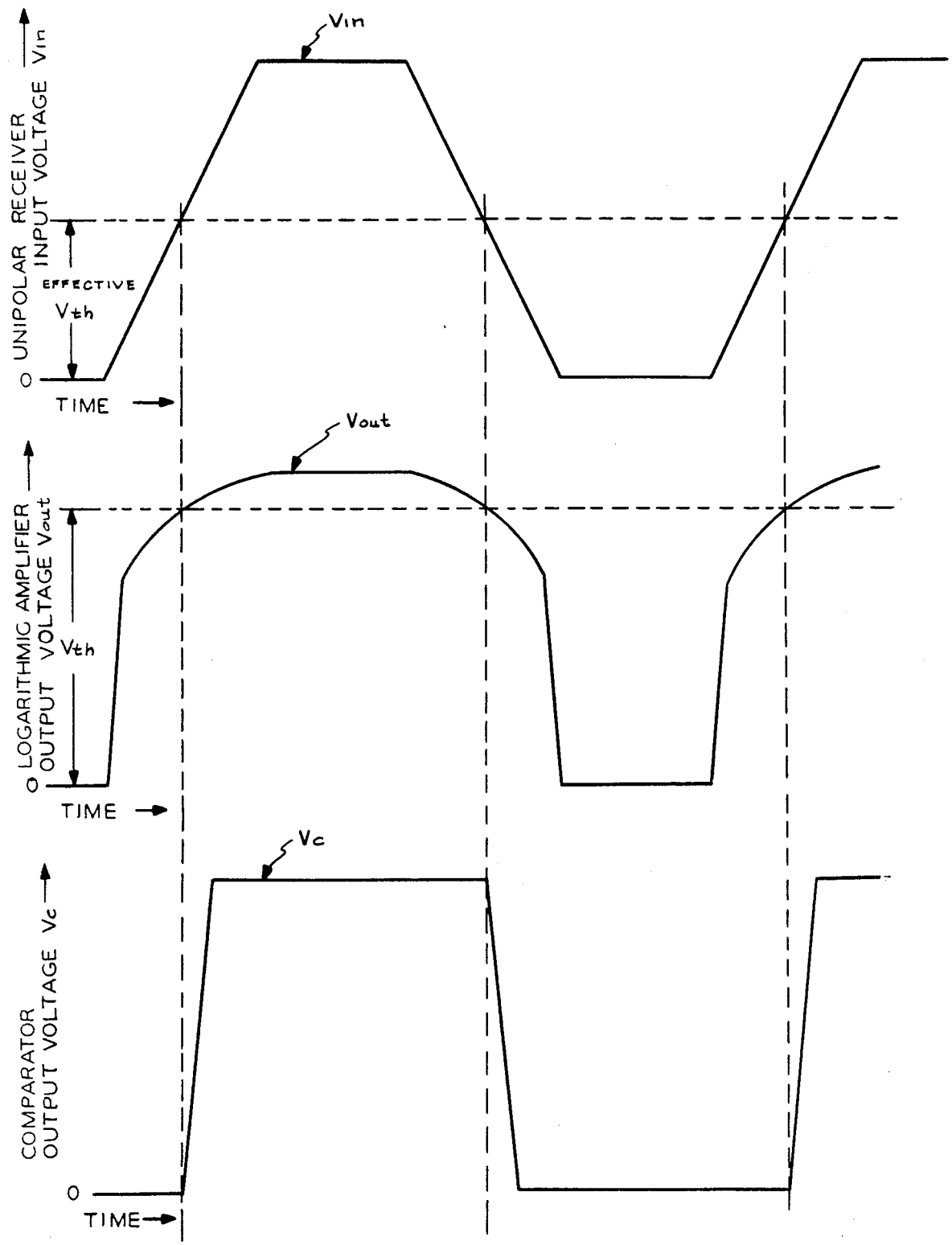
FIG. 8 shows three separate graphs, each having one curve, of voltage along the vertical axis, versus time along the horizontal axis, and which include an upper graph of unipolar receiver input voltage versus time, a middle graph of logarithmic amplifier output voltage versus time, and a lower graph of comparator output voltage versus time.

Referring to FIG. 8, the upper curve shows the unipolar receiver input voltage Vin, and the effective threshold voltage Vth, plotted against time. The effective threshold voltage Vth is 50 percent of the value of the input voltage Vin. Also in FIG. 8, the middle curve shows the logarithmic amplifier output voltage Vout, and the logarithmic threshold voltage Vth, plotted against time. Also in FIG. 8, the lower curve shows the comparator output voltage Vc plotted against time.

By comparing the three curves of FIG. 8, it is apparent that the desired receiver output Vc is a rectangular wave with transitions timed at the half-amplitude points of the receiver input Vin. It is also apparent that receiver output Vc switches when the amplifier output Vout exceeds the receiver threshold Vth. Thus, receiver 10 retains the transition voltage versus time relation of a unipolar signal by its logarithmic amplitude response. Also, receiver 10 recovers the output transition timing, by using a slicing threshold, which is comprised of the logarithmic output less a fixed bias.

Receiver 10 would drive a decoding system (not shown). With the construction of receiver 10, error in the threshold voltage Vth is minimized, whereby error in the output pulse duration is minimized. With the construction of receiver 10, the amplitude-time relationship is preserved, whereby the threshold generation becomes more accurate. With the construction of receiver 10, the output amplitude range is restricted in a predictable manner.

The following equations derive the general values of output voltage Vout and threshold voltage Vth. The two curves 124, 126 of FIG. 7 are also based on these equations, using specific values of Ka=1000 and Kb=0.33 for the constants.

(a) Vout=kb log Ka Vin
(b) Vth=Kb log Ka (Vin/2)
(c) Vth=Kb [log Ka Vin−log 2]
(d) Vth=Kb log Ka Vin−Kb log 2
(e) Vth=Vout−Kb log 2

Where
  =Vout=Voutput
  Vin=Vinput
  Vth=Vthreshold

Using the above equations, Table 1 was prepared in order to further describe receiver 10. Table 1 is shown hereafter.

| 1 | 2 | 3 | 4 | 5 | 6 | 7 | 8 | 9 |
|---|---|---|---|---|---|---|---|---|
| 1E-5 | −5 | 10  | 1 | 0.8v | 0.241 | 0.559 | 5   | .8E5 |
| 1E-4 | −4 | 1E2 | 2 | 1.6v | 0.241 | 1.359 | 50  | 1.6E4 |
| 1E-3 | −3 | 1E3 | 3 | 2.4v | 0.241 | 2.159 | 500 | 2.4E3 |
| 1E-2 | −2 | 1E4 | 4 | 3.2v | 0.241 | 2.959 | 5E3 | 3.2E2 |
| 1E-1 | −1 | 1E5 | 5 | 4.0v | 0.241 | 3.759 | 5E4 | 4E1 |

| Table 1 Column No. | Table 1 Column Heading |
|---|---|
| 1 | Vin, where 1E-N = $1 \times 10^{-N}$ |
| 2 | log Vin |
| 3 | Ka Vin, where Ka = 1E6 = $1 \times 10^6$ |
| 4 | log Ka Vin |
| 5 | Vout = Kb log Ka Vin, where Kb = 0.8 |
| 6 | Kb log 2 |
| 7 | Vth = Vout − Kb log 2 |
| 8 | $\log^{-1} \frac{Vth}{Kb} = \frac{1}{2}$ Ka Vin |
| 9 | $\frac{Vout}{Vin}$ |

Table 1, which is shown above, gives a mathematical description of receiver 10, and is based upon the above-described equations, using specific values of Ka=1E6 and Kb=0.8 for the constants. Table 1 shows that the fixed difference which is equal to −Kb log 2, or increment which is equal to +Kb log 0.5, is subtracted from the output amplitude to generate the threshold, and is one-half the input level.

Table 1 shows that gain constant Ka can represent receiver gain. Gain constant Ka also has a biasing or shifting effect on the logarithmic output. This is indicated by a comparison of columns 2 and 4 in Table 1. Modifications can be made to the formulas. For example, a third constant, such as Kc, could be added to the output voltage equation c, for translation, in order to tailor the signal ranges to the reality of a particular circuit format.

Table 1 also shows that, after logarithmic amplification of the input signal, a fixed difference, which is shown in Table 1 as −Kb log 2, that is equal to +Kb log 0.5, is subtracted from the output, to provide a threshold, which represents one-half the input amplitude throughout the input range. This is illustrated by equation d and by a comparison of columns 3 and 8 of Table 1. Modifications can be made to the example shown in FIG. 7. For example, other fractions of input could be represented by the logarithm of that fraction in threshold generation. In FIG. 7, the fixed increment, or difference, is shown as −Δ=Vout−Vth.

Thus, the equations, and Table 1, illustrate that receiver 10 can provide a predictable, accurate gain law, so that amplitude slicing or threshold generation can be provided for substantially any signal level.

While it is apparent that the embodiments of the invention are intended to fulfill the objects of the invention, it will be appreciated that the invention is susceptible to modification and change. It is intended that the following claims cover all such modifications within the proper scope of the invention.

What is claimed is:

1. A receiver for use in a fiber optic data communication system for recovering multi-bit binary digital messages from unipolar trapezoidal Manchester optical signals transmitted in the system, said receiver comprising:
   a photo-detector circuit for converting the received optical signals into a range of unipolar electrical signals;
   a logarithmic amplifier circuit coupled to the photo-detector circuit for converting the unipolar electric signals into a range of logarithmic unipolar signals;
   a comparator coupled to an output of the logarithmic amplifier circuit for converting the logarithmic unipolar signals into bipolar signals; and
   a logarithmic threshold circuit coupled to the logarithmic amplifier circuit and coupled to the input of the comparator for providing logarithmic threshold signals to the comparator for establishing a switching point for the comparator at the mid-amplitude level of the received optical signals.

2. The receiver as claimed in claim 1, wherein the logarithmic amplifier circuit includes:
   a post amplifier circuit coupled to the output of the pre-amplifier circuit, and
   a logarithmic amplifier unit coupled to the output of said pot amplifier circuit, said logarithmic amplifier unit being coupled to said comparator and being coupled to said logarithmic threshold circuit.

3. The receiver as claimed in claim 2, wherein the logarithmic threshold circuit includes:
   a threshold sensing circuit coupled to the logarithmic amplifier circuit for sensing the signals in the logarithmic amplifier circuit and for subtracting a fixed portion therefrom to form the logarithmic threshold signals, and
   a threshold storage circuit coupled to the threshold sensing circuit for storing the logarithmic threshold signals and coupled to the comparator for providing the logarithmic threshold signals to the comparator.

4. The receiver as claimed in claim 3, wherein the threshold sensing circuit includes:
   a pulse generator coupled to the output of the logarithmic amplifier unit,
   a switch coupled to the output of the logarithmic amplifier unit and coupled to the output of the pulse generator, and
   a shift unit coupled to the output of the switch and coupled to the input of the threshold storage circuit,
   said shift unit including a capacitor coupled to the output of the switch and a ground coupled to the capacitor.

5. The receiver as claimed in claim 4, wherein the threshold storage circuit includes:
   an NPN transistor having an input coupled to the output of said switch and coupled to said capacitor and having an output coupled to said ground, and
   a zener diode having an input coupled to the output of said NPN transistor and having an output coupled to said comparator.

6. The receiver as claimed in claim 3, wherein the threshold sensing circuit includes:
   a resistor assembly coupled to the output of said post amplifier circuit, and
   a second logarithmic amplifier unit coupled to said resistor assembly and coupled to the input of said threshold storage circuit, and wherein
   said resistor assembly includes,
   a first resistor coupled to the output of said post amplifier unit,
   a second resistor coupled to the output of said first resistor,
   a ground coupled to the output of said second resistor, and
   a connector connecting the output of said first resistor to the input of said second resistor, said connector being coupled to the input of said second logarithmic amplifier unit.

7. The receiver as claimed in claim 3 wherein the threshold sensing circuit includes:
   a zener diode coupled to the output of said logarithmic amplifier unit,
   a resistor coupled to the output of said zener diode,
   a ground coupled to the output of said resistor, and
   a connector coupled to the output of said zener diode and coupled to the input of said resistor, said connector being coupled to the input of said threshold storage circuit.

8. The receiver as claimed in claim 3, and including a pre-amplifier circuit coupled to the output of the photo-detector circuit and coupled to the input of the logarithmic amplifier circuit for converting an output current from the photo-detector circuit to an amplified input voltage to the logarithmic amplifier circuit.

9. The receiver as claimed in claim 3, and including, a delay circuit coupled to the output of the logarithmic amplifier circuit and coupled to the input of the comparator for delaying the signals from the logarithmic amplifier circuit to the comparator so that the signals from the logarithmic threshold circuit arrive at the comparator before the signals from the logarithmic amplifier circuit.

10. A receiver for a data communication system for recovering messages from unipolar electrical signals, said receiver comprising:
   a logarithmic amplifier circuit for converting the unipolar electrical signals into a range of logarithmic unipolar signals,
   a comparator coupled to the logarithmic amplifier circuit for converting the logarithmic unipolar signals into bipolar signals; and
   a logarithmic threshold circuit coupled to the comparator for providing logarithmic threshold signals to the comparator for establishing a switching point for the comparator at the mid-amplitude level of the unipolar electrical signals.

* * * * *